(12) United States Patent
Jones et al.

(10) Patent No.: US 9,803,808 B2
(45) Date of Patent: Oct. 31, 2017

(54) OPTIC HOLDER WITH INTEGRATED LIGHT PREMIXER

(71) Applicant: Fraen Corporation, Reading, MA (US)

(72) Inventors: Carlton S. Jones, Boxford, MA (US); Marco Angelini, Trivolzio (IT)

(73) Assignee: Fraen Corporation, Reading, MA (US)

( * ) Notice: Subject to any disclaimer, the term of this patent is extended or adjusted under 35 U.S.C. 154(b) by 80 days.

(21) Appl. No.: 14/826,642

(22) Filed: Aug. 14, 2015

(65) Prior Publication Data

US 2016/0047511 A1 Feb. 18, 2016

Related U.S. Application Data

(60) Provisional application No. 62/037,667, filed on Aug. 15, 2014.

(51) Int. Cl.
| | |
|---|---|
| *A41F 1/00* | (2006.01) |
| *F21K 99/00* | (2016.01) |
| *F21V 5/04* | (2006.01) |
| *G02B 19/00* | (2006.01) |
| *F21K 9/61* | (2016.01) |

(Continued)

(52) U.S. Cl.
CPC ............... *F21K 9/52* (2013.01); *F21K 9/61* (2016.08); *F21K 9/62* (2016.08); *F21V 5/045* (2013.01); *G02B 19/0028* (2013.01); *G02B 19/0061* (2013.01); *F21V 7/0091* (2013.01); *F21Y 2115/10* (2016.08); *G02B 6/0008* (2013.01);

(Continued)

(58) Field of Classification Search
CPC ..... F21K 9/52; F21K 9/61; F21K 9/62; F21K 9/68; F21V 5/045; F21V 7/0091; F21Y 2115/10; G02B 6/0096
See application file for complete search history.

(56) References Cited

U.S. PATENT DOCUMENTS

| | | |
|---|---|---|
| 2003/0147154 A1 | 8/2003 | Shimizu |
| 2004/0090598 A1 | 5/2004 | Morinaga |

(Continued)

FOREIGN PATENT DOCUMENTS

| | | |
|---|---|---|
| WO | 03/071352 A1 | 8/2003 |
| WO | 2012/004760 A1 | 1/2012 |

(Continued)

OTHER PUBLICATIONS

International Search Report and Written Opinion for corresponding PCT Application PCT/US2015/045297 date of mailing Oct. 20, 2015; date of completion Oct. 13, 2015.

*Primary Examiner* — Ali Alavi
(74) *Attorney, Agent, or Firm* — Reza Mollaaghababa; Thomas J. Engellenner; Pepper Hamilton LLP

(57) ABSTRACT

Optical systems including an optic holder with integrated light premixer are disclosed. In one embodiment, an optical system includes a lens holder adapted for holding at least one lens, said lens holder comprising a hollow waveguide extending from a proximal end adapted to receive light from a light source to a distal end, wherein said hollow waveguide comprises a reflective optical surface for reflecting at least a portion of the light received from the light source so as to direct the reflected light to said distal end of the waveguide. In some embodiments, the lens holder may be configured to receive a plurality of nested lenses optically coupled to said distal end of the waveguide.

9 Claims, 11 Drawing Sheets

(51) Int. Cl.
*F21K 9/62* (2016.01)
*F21V 8/00* (2006.01)
*F21V 7/00* (2006.01)
*G02B 6/32* (2006.01)
*G02B 6/36* (2006.01)
*F21Y 115/10* (2016.01)

(52) U.S. Cl.
CPC .............. *G02B 6/0096* (2013.01); *G02B 6/32* (2013.01); *G02B 6/3624* (2013.01)

(56) References Cited

U.S. PATENT DOCUMENTS

2012/0140463 A1* 6/2012 Kinzer ................. F21V 7/0091
362/231
2014/0036510 A1 2/2014 Preston et al.

FOREIGN PATENT DOCUMENTS

| WO | 2013/116723 A1 | 8/2013 |
| WO | 2013/184600 A1 | 12/2013 |

* cited by examiner

OPTIC HOLDER WITH INTEGRATED LIGHT PREMIXER

RELATED APPLICATION

The present application claims priority to provisional application No. 62/037,667, titled "Optic Holder With Integrated Light Premixer," which was filed on Aug. 15, 2014. This application incorporates the content of the provisional application by reference in its entirety.

BACKGROUND

The present teachings relate to optical systems that can provide mixing of light as well as shaping of the mixed light, e.g., converging the mixed light to generate a narrow angular beam profile.

It is typically challenging to produce a narrow beam of light when using multi-chip LED (light emitting diode) sources, e.g., when using LED packages with 2 or more LED chips. For example, in some lighting applications in which individual LED chips are separated by a gap, or in which the LED chips emit different colors, a beam of light generated by mixing the light from the LED chips can exhibit a dark spot at its center and/or may exhibit poor color mixing, respectively.

Hence, there is a need for improved optical systems that can provide mixing of light emitted by one or a plurality of light sources and can shape the angular profile of the mixed light, and in particular, there is a need for improved systems that can mix light from light sources providing light of different colors.

SUMMARY

In one aspect, the present teachings provide an optical system, which includes a solid waveguide, e.g., a solid lightpipe, that extends from a proximal end, adapted to receive light from one or more light sources (e.g., one or more LEDs), to a distal end that is optically coupled to a lens. At least a portion of the light rays entering the light pipe can undergo reflections (in some cases multiple reflections) at a peripheral surface of the light pipe (e.g., via total internal reflection (TIR) or specular reflection) as they propagate from the proximal end to the distal end of the lightpipe, which is optically coupled to the lens. Such reflections can cause mixing of the light rays, which can be beneficial in a variety of applications, e.g., for color mixing when light sources emitting light with different colors are optically coupled to the lightpipe. In many embodiments, the lightpipe can have a geometrical cross-sectional shape characterized by an even number of sides, e.g., a square, hexagonal or octagonal shape.

The lens can include an input surface for receiving light from the lightpipe, a peripheral surface that is adapted to reflect light rays incident thereon via total internal reflection, and an output surface through which the light exits the lens. In some embodiments, the input surface can be configured to provide a cavity, which can receive at least a portion of a distal end of the lightpipe. In some cases, the input surface can have a concave, a convex, or a mixed concave/convex profile. Further, in some embodiments, a plurality of microlenses can be disposed on the output surface of the lens to cause further mixing of the light rays as they exit the lens through the output surface.

In another aspect, the present teachings provide an optical system that includes a hollow light-mixing optic (e.g., a hollow lightpipe) that is configured to receive light from a light source and is optically coupled at its distal end to another optic. The light mixing optic causes the mixing of the light rays it receives and optically couples the mixed light to the other optic, which can in turn provide additional mixing of the light and/or narrowing of the angular distribution of its light rays. In some embodiments, the hollow light-mixing optic is herein referred to as a pre-mixing optic as it mixes the light received from at least one light source before the light reaches a lens. In some cases, the lens can provide additional mixing of the light it receives from the hollow light-mixing optic.

As discussed below, in some embodiments, the hollow light-mixing optic is implemented by providing a reflective optical surface over at least a portion of an inner surface of a holder in which a lens, e.g., a mixing/convergent lens, is mounted. As discussed in more detail below, by way of example, the reflective optical surface can be produced on the inner surface of a portion of the lens holder, which can be formed of a high-temperature, non-transparent material such as Nylon® or Ultem®, by coating that inner surface with a metal (e.g., aluminum), or by disposing thin metal inserts (e.g., aluminum inserts) on that inner surface. One advantage of forming the hollow lightpipe as a reflective surface on an inner surface of a lens holder is that by simply mounting the lens into the lens holder, alignment of the light pipe (premixer element) with the lens is achieved. As discussed below, another advantage is that such a hollow lightpipe can be coupled to high power light sources, such as high power light emitting diodes (LEDs).

According to one aspect, there is provided an optical system, comprising a lens holder adapted for holding a lens, said lens holder comprising a hollow waveguide extending from a proximal end adapted to receive light from a light source to a distal end, wherein said hollow waveguide comprises a reflective optical surface for reflecting at least a portion of the light received from the light source so as to direct the reflected light to said distal end of the waveguide. In some embodiments, the lens holder may comprise a cavity for at least partially receiving said lens, wherein said cavity is configured such that the lens, when disposed therein, is optically coupled to said distal end of the waveguide. In many embodiments, the lens holder has a cross-sectional profile having a geometrical shape characterized by an even number of sides, e.g., a square, hexagonal or octagonal shape.

In some embodiments, the reflective optical surface may comprise a metal coating disposed on an underlying inner surface of the lens holder. In some embodiments, the waveguide may be adapted to cause mixing of at least a portion of the received light rays via reflection at the reflective optical surface.

In some embodiments, the lens holder may comprise a first piece and a second piece configured to couple to the first piece so as to form the lens holder. In some embodiments, the lens holder may comprise a proximal portion comprising the hollow waveguide and a distal portion configured to receive the lens. In some embodiments, the lens holder may include a multifaceted depression comprising the reflective optical surface. In some embodiments, the reflective optical surface may be a preformed metal reflector.

According to another aspect, there is provided an optical system, comprising a solid lightpipe extending from a proximal end to a distal end, said lightpipe being configured for optical coupling at its proximal end to a light source. The optical system further comprises a lens having an input surface, an output surface, and a peripheral surface extending between the input surface and the output surface, said input surface being optically coupled to said distal end of the lightpipe to receive light therefrom, wherein said peripheral surface of the lens is configured to reflect via total internal reflection light received from the lightpipe incident thereon. In some embodiments, the optical system may further comprise a plurality of microlenses disposed on the output surface of the lens. In some embodiments, the solid lightpipe may comprise a metal coating disposed on an underlying inner surface thereof. In some embodiments, the solid lightpipe may be adapted to cause mixing of at least a portion of light rays from the light source via reflection at said inner surface. In some embodiments, the solid lightpipe may be configured to reflect light received from the light source via total internal reflection.

According to another aspect, there is provided an optical system, comprising a lens holder that includes a hollow waveguide extending from a proximal end adapted to receive light from a light source to a distal end, and further comprising a distal portion configured to receive at least one lens, wherein said hollow waveguide comprises a reflective optical surface for reflecting at least a portion of the light received from the light source so as to direct the reflected light to said distal end of the waveguide. The optical system further comprises a plurality of nested lenses disposed within the distal portion of said lens holder and optically coupled to said hollow waveguide so as to receive the reflected light from said distal end of the waveguide.

In some embodiments, the reflective optical surface may comprise a metal coating disposed on an underlying inner surface of the lens holder. In some embodiments, the waveguide may be adapted to cause mixing of at least a portion of the received light rays via reflection at the optical surface thereof. In some embodiments, the lens holder may include a multifaceted depression comprising the reflective optical surface. In some embodiments, the reflective optical surface may be a preformed metal reflector.

DETAILED DESCRIPTION

Figure 1A:
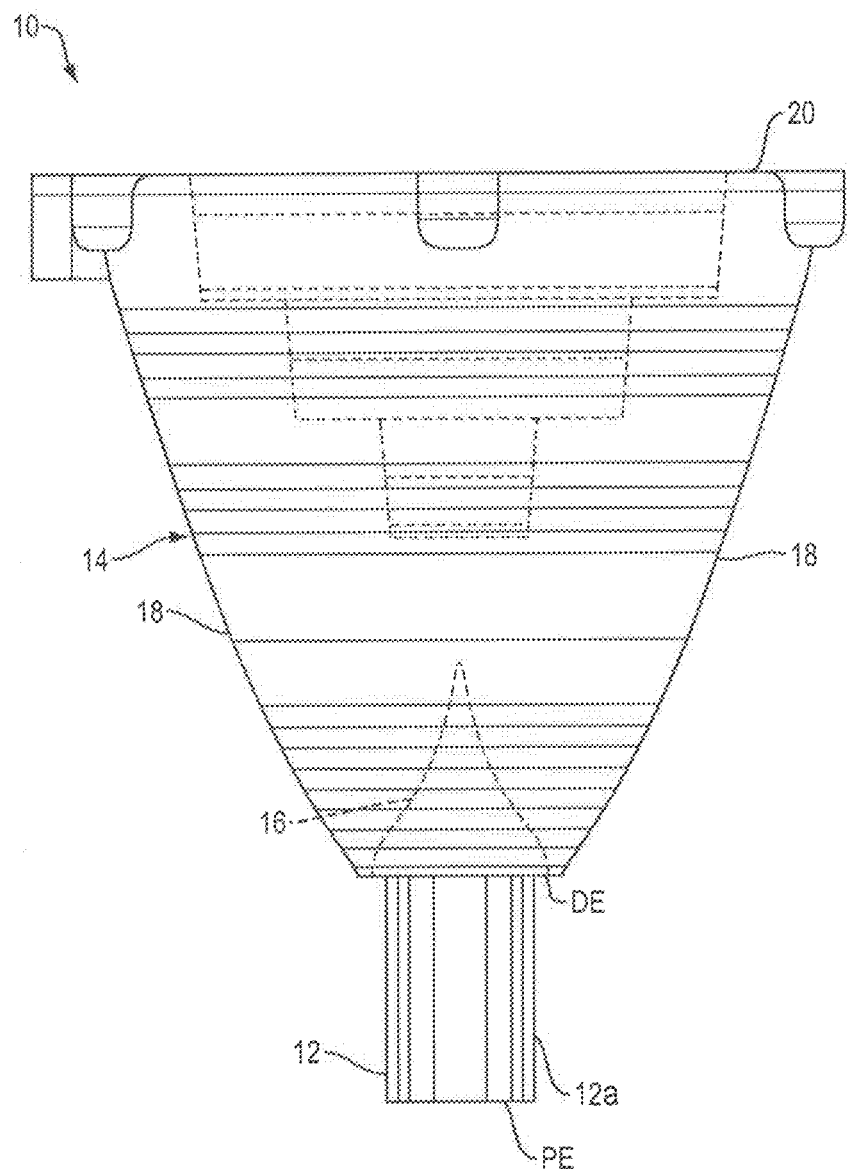
FIG. 1A is a schematic diagram of one embodiment of an optical system configured according to aspects of the present disclosure.

FIG. 1A schematically depicts an optical system 10 according to the present teachings, which includes a solid lightpipe 12 that extends from a proximal end (PE) to a distal end (DE). The lightpipe includes a peripheral surface 12a, which extends between the proximal and the distal ends of the lightpipe, and is configured to reflect light rays incident thereon via total internal reflection (TIR). In other embodiments, the peripheral surface of the lightpipe can be metalized so as to reflect light rays incident thereon via specular reflection. While in this embodiment, the lightpipe is in the form of a cylinder, in other embodiments, it can have other shapes, e.g., it can be have a square, rectangular, hexagonal, or octagonal cross-sectional profile in a plane orthogonal to its longitudinal axis (i.e., an axis extending from the proximal end to the distal end).

Figure 1B:
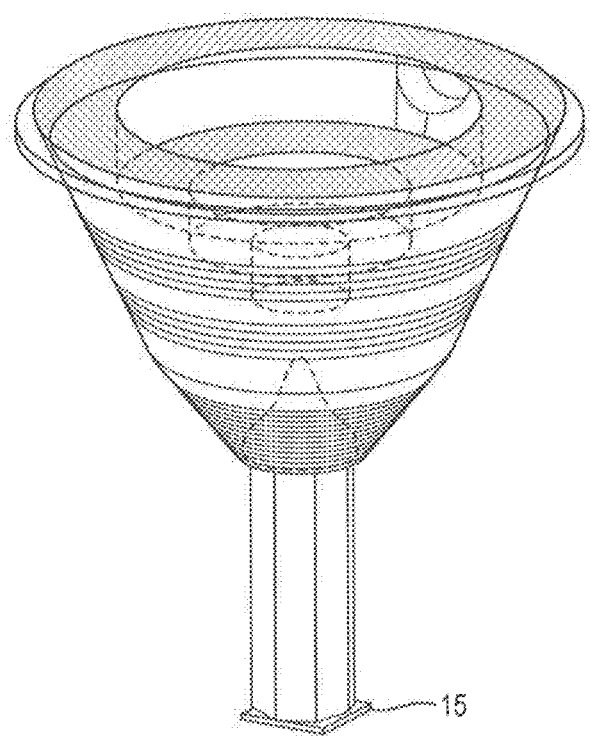
FIG. 1B is a perspective view of the optical system of FIG. 1A, further showing a light source according to aspects of the present disclosure.

The lightpipe is optically coupled at its distal end to a lens 14. As shown in FIG. 1B, the lightpipe 12 can be coupled optically to a light source 15 (e.g., an LED or a multi-LED chip) to receive light emitted by that source. In some embodiments, a portion of the light received by the lightpipe can propagate through the lightpipe to reach the lens without undergoing any reflection at the peripheral surface of the lightpipe while another portion of the received light can undergo one or more reflections at the peripheral surface as it propagates through the lightpipe to reach the lens. In some cases, a light source coupled to the lightpipe can provide a highly divergent light beam such that the majority of the light rays entering the light pipe would undergo one or more reflections at its peripheral surface as they propagate through the lightpipe to reach the lens.

Figure 1C:
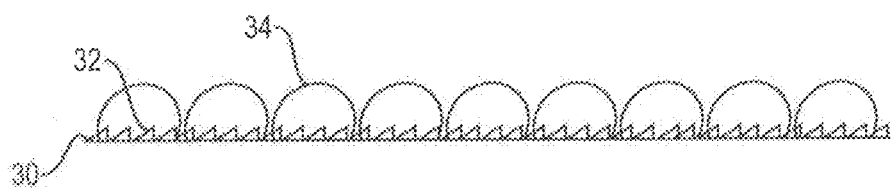
FIG. 1C is a schematic diagram illustrating a cross-section of an output surface of an embodiment of a lens employed in an optical system according to the present teachings, which includes surface structures as well as a plurality of microlenses.

With reference to FIG. 1A, the lens 14 is a TIR (total internal reflection) lens, which includes an input surface 16 through which the light enters the lens, a peripheral surface 18 at which incident light rays undergo total internal reflection, and an output surface 20 through which light rays can exit the lens (while in this embodiment the output surface 20 has a stepped structure in other embodiments the output surface can be formed as one contiguous surface). In use, a portion of the light rays entering the lens can propagate from the input surface to the output surface to exit the lens, and another portion of the light rays can strike the peripheral surface of the lens to be reflected at that surface via TIR toward the output surface of the lens. In some embodiments, the lens 14 is configured to narrow the angular distribution profile of the light rays to provide a narrow light beam. Further, in some embodiments, the output surface of the lens can include surface texturing, or a plurality of microlenses, to provide mixing of the light rays as they pass through the output surface. Further, in some embodiments, the output surface of the lens can include both surface texturing and a plurality of microlenses for mixing of the light. For example, FIG. 1C schematically depicts the output surface 30 of such an embodiment of the lens having a textured surface 32 as well as a plurality of microlenses 34.

With reference to FIGS. 2A, 2B, 2C, 2D, and 2E, an optical system 100 according to another embodiment of the present teachings includes a lens 120 and a lens holder 140 adapted to receive the lens 120. The lens holder 140 includes a proximal portion 140a and a distal portion 140b. The distal portion 140b provides a cavity in which the lens 12 can be mounted. The proximal portion 140a provides a hollow waveguide 160 (herein also referred to as a hollow light pipe) that can optically couple to a light source 170 (See FIG. 2E) at its proximal end (PE) and to the lens 120 at its distal end. The lightpipe 160 can mix the received light via reflection at its optical surfaces, and transmit the mixed light to the lens 120. In this embodiment, the waveguide 160 has an octagonal cross-section (in other embodiments, other cross-sectional profiles can be employed). In many embodiments, the waveguide 160 can have a cross-sectional profile characterized by a geometrical shape having an even number of sides, e.g., a square, hexagonal, or octagonal shape.

An inner surface of the proximal portion of the lens holder is coated with a metal to provide a reflective optical surface. More specifically, in this embodiment, an inner surface of the proximal portion of the lens holder is coated with a metal, e.g., aluminum, via vacuum metallization. The metal coating provides a reflective optical surface that causes reflection of the light from a light source incident thereon so as to cause, e.g., the mixing of an incoming diverging light beam.

Figure 2A:
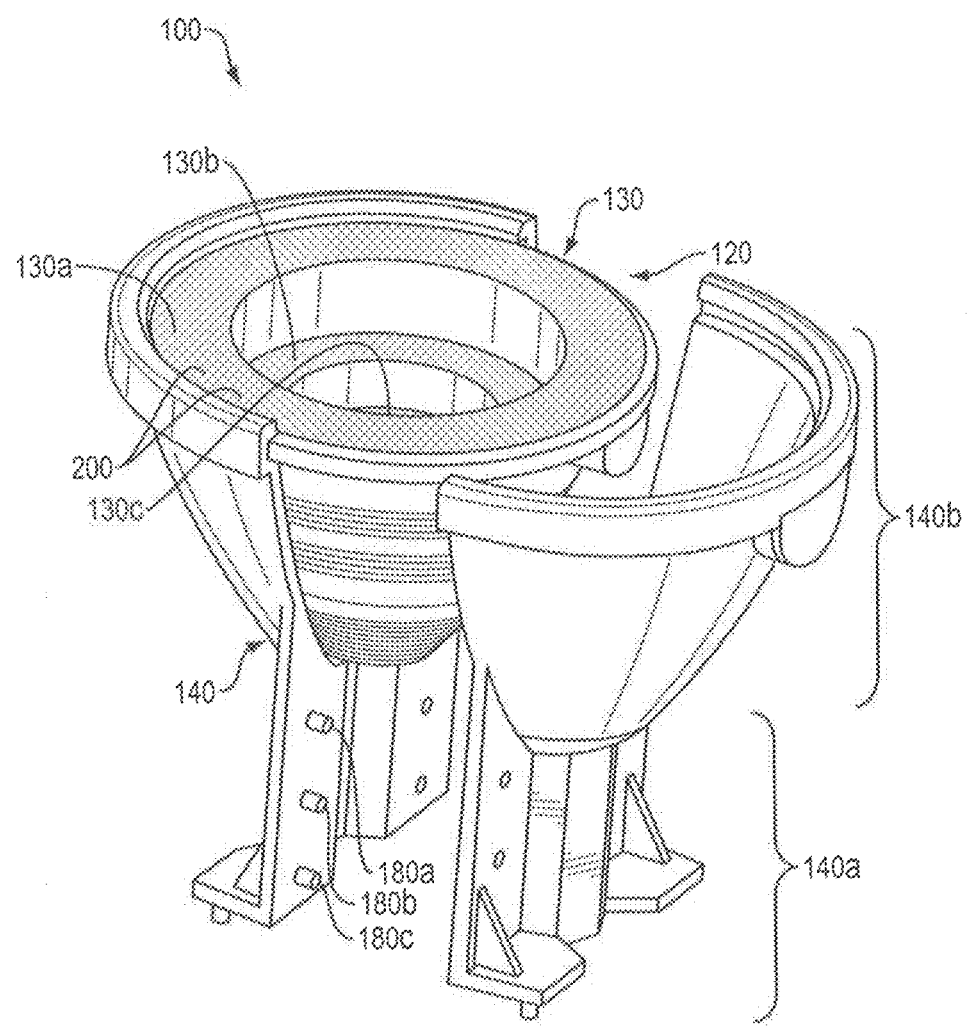
FIG. 2A is a perspective view of one embodiment of an optical system including a lens holder according to aspects of the present disclosure.
Figure 2B:
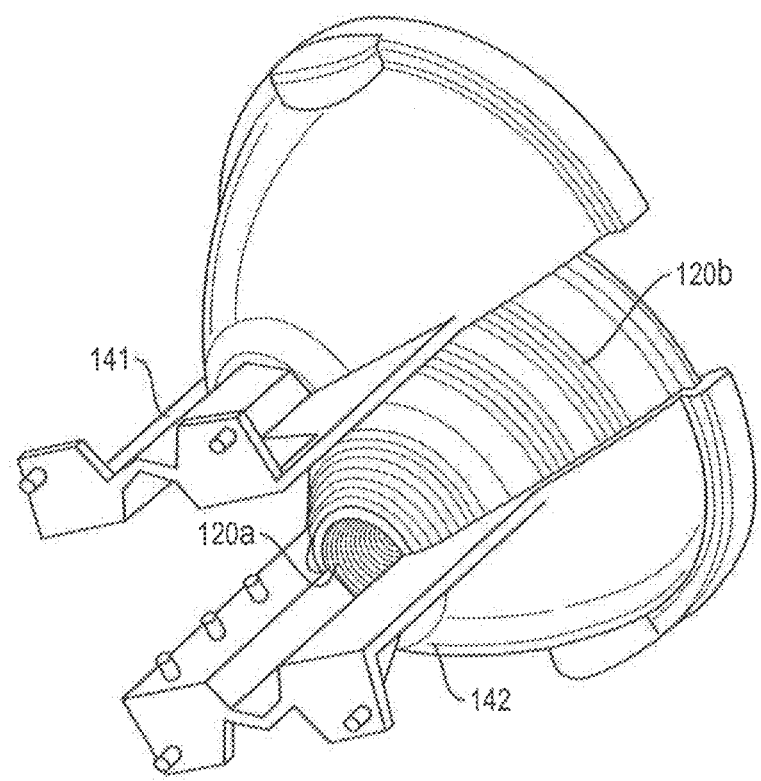
FIG. 2B is a perspective view of the optical system of FIG. 2A, showing the two pieces of the lens holder according to aspects of the present disclosure.
Figure 2C:
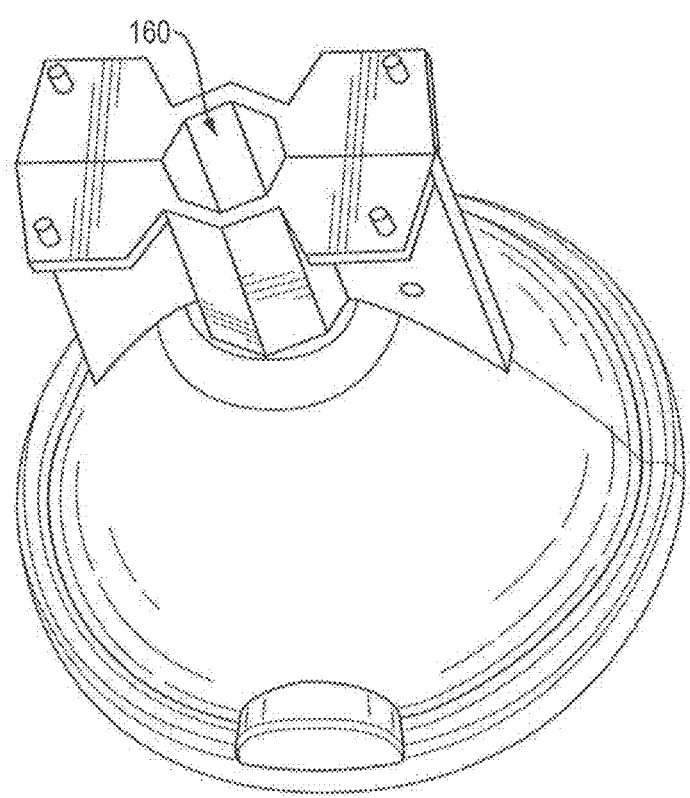
FIG. 2C is a perspective view of the optical system of FIG. 2A, showing a hollow waveguide formed by the lens holder according to aspect so the present disclosure.
Figure 2D:
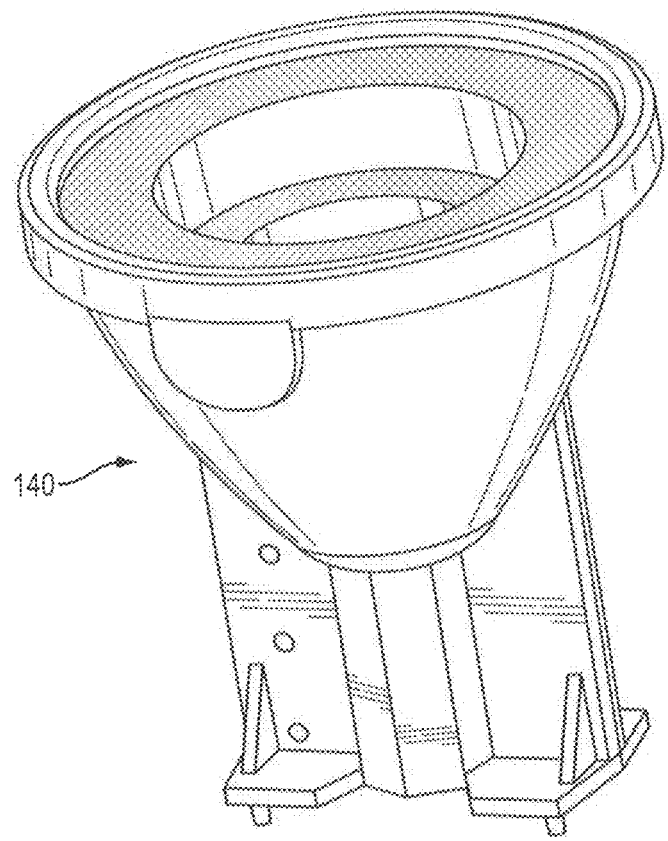
FIG. 2D is another perspective view of the optical system of FIG. 2A, configured according to aspects of the present disclosure.

More specifically, as shown in FIGS. 2A and 2B, in this embodiment, the lens holder 140 comprises two separate pieces 141 and 142 that can be coupled together, e.g., via a plurality of fasteners (such as fasteners 180a, 180b, and 180c), to form the lens holder including the hollow lightpipe. The proximal portion of each piece provides one half of the lightpipe. The inner surface of the proximal portion of each piece is coated with a metal coating to reflect the light incident thereon such that when the two pieces 141 and 142 are joined together the lightpipe is formed.

In some embodiments, the two pieces 141 and 142 can be metalized separately, e.g., via vacuum metallization of the open surface of each piece, and then joined together to form the lens holder. In some embodiments, the entire inner surface of each piece is metal coated so as to provide the lightpipe and also provide a metal surface on the inner surface of a distal portion of the lens holder in which the lens is mounted. Alternatively, in other embodiments, only the inner surface of the proximal portion of the holder, which provides the underlying surface of the lightpipe, is coated with a metal.

While in this embodiment the lens holder 140 is formed of two pieces that can be joined together, in some other embodiments, the lens holder 140 can be formed as a single integral unit.

Figure 2E:
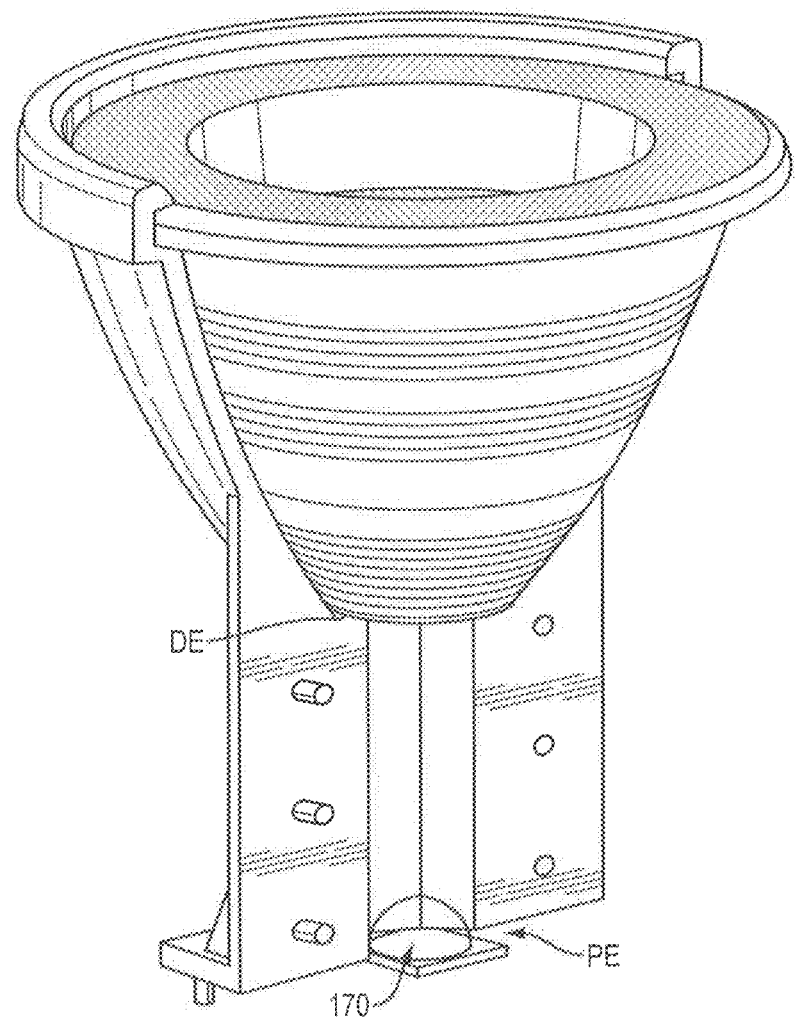
FIG. 2E is a perspective view of the optical system of FIG. 2A, showing a light source according to aspects of the present disclosure.

With reference to FIG. 2E, in use, the lens holder 140 with the lens 120 mounted therein can be optically coupled to a light source 170 (e.g., a LED), or a plurality of light sources, to receive light emitted by the light source(s) (for clarity, only one half of the lens holder is depicted in this figure). Some of the light rays can pass through the lightpipe and enter the lens 120 without undergoing any reflection at the reflective surface of the light pipe, and some of the light rays can undergo one or more reflections at the reflective surface of the lightpipe as they propagate from the proximal end of the lightpipe to its distal end. In many embodiments, the majority of the light rays emitted by a source (e.g., LED) that enter the light pipe undergo reflections (in many cases multiple reflections) at its metal-coated surface prior to entering the lens 120 via its proximal end (input surface) (120a). The reflections of the light rays at the reflective surface(s) of the lightpipe can cause mixing of the light rays. Such mixing of the light rays can be advantageous in many applications, and in particular in those applications that employ light sources of different colors (e.g., LEDs emitting different colors).

The lens guides the received light (e.g., via TIR at its peripheral surface) from its input surface to its output surface through which the light exits the lens. Some of the light entering the lens is reflected at a peripheral surface 120b thereof to exit the lens through the output surface 130. In this embodiment, the output surface 130 of the lens includes surface segments 130a, 130b, and 130c arranged in a stepped structure. Further, a plurality of microlenses 200 are disposed on each of the surface segments 130a, 130b, and 130c to cause mixing of the light rays as they exit the lens. In other embodiments, the surface segments lack such microlenses. While in this embodiment, each surface segment 130a, 130b, and 130c is substantially flat, in other embodiments, one or more of these segments can be curved. Further, in other embodiments, the output surface of the lens 120 can be in the form of a contiguous surface. In some embodiments, the lens 120 exhibits a positive optical power to cause narrowing of the light passing therethrough.

In this embodiment, the index of refraction of the material forming the lens and the profile of the peripheral surface 120b are selected such that light rays incident on the peripheral surface, or at least a majority of those rays, undergo total internal reflection at the peripheral surface. In yet other embodiments, a thin metal layer can be disposed externally on the peripheral surface 120b to cause specular reflection of the light rays incident on that surface.

As shown schematically in FIG. 2E, one advantage of the hollow lightpipe 160 is that it can readily receive a domed top LED, which includes a domed lens coupled to a light-emitting element of the LED, at its proximal end. Further, in those embodiments in which the light source is a side-emitting LED, upon coupling the LED with the hollow lightpipe, the majority of the divergent light rays emitted by the LED can undergo reflections at the reflective surface of the lightpipe, which can in turn provide efficient mixing of those light rays.

Another advantage of the lens holder 140, which provides the hollow lightpipe 160, is that it can allow coupling the lens to high-power light sources, e.g., high-power LEDs. In particular, in many embodiments, the metal surface of the hollow lightpipe can withstand high temperatures that may be generated as a result of coupling of the light from a high power light source into the lightpipe. Further, the use of the hollow lightpipe allows forming the lens holder of a material that provides high thermal conductivity to facilitate heat dissipation, although it may not be transparent to visible light. Some examples of such materials include, without limitation, thermally conductive plastics, such as Bayer Makrolon TC8030 (polycarbonate with 60% aluminum).

Figure 3A:
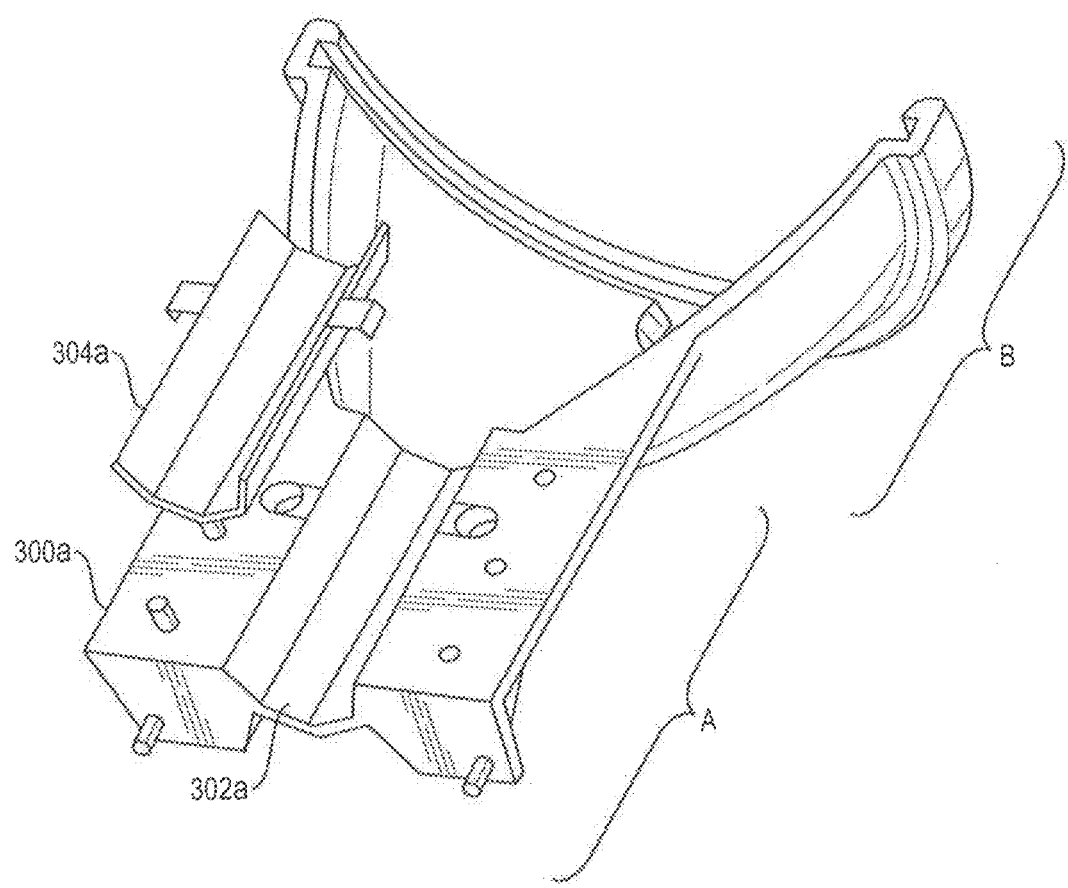
FIG. 3A is a schematic diagram of a first piece of a lens holder configured to couple to a thin preformed metal reflector according to aspects of the present disclosure.
Figure 3B:
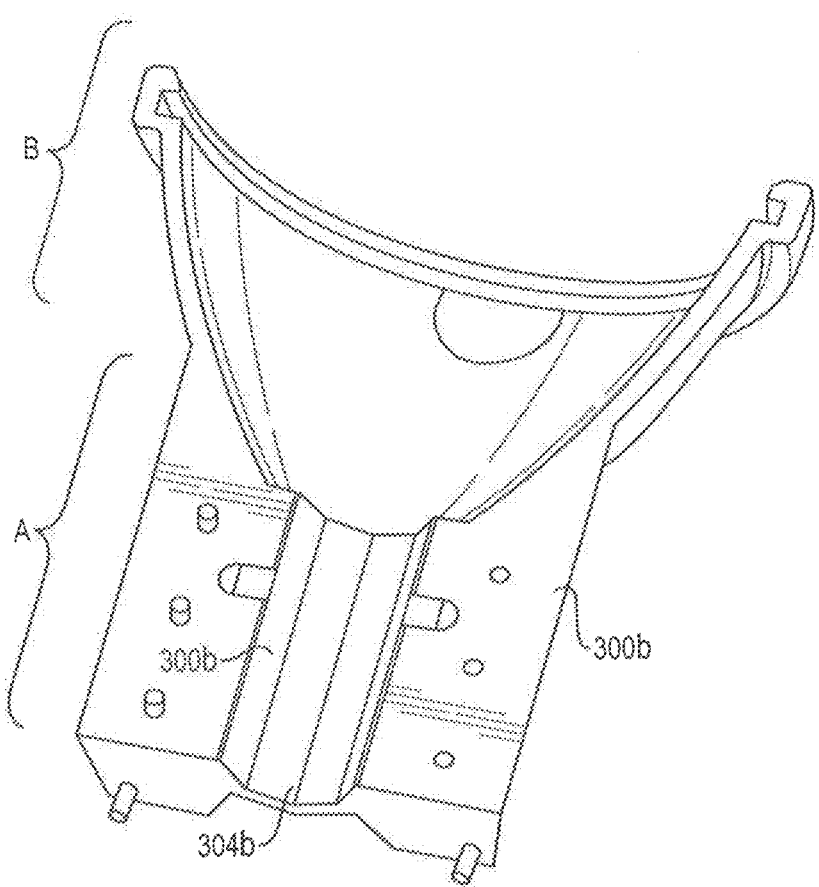
FIG. 3B is a schematic diagram of a second piece of a lens holder coupled to a thin preformed metal reflector and configured to couple with the first piece of FIG. 3A according to aspects of the present disclosure.

In another embodiment, rather than coating the inner surface of a portion of a lens holder via metal evaporation to form a hollow lightpipe, preformed thin metal inserts can be disposed on the inner surface to form a hollow lightpipe. By way of example, FIGS. 3A and 3B schematically depict two pieces 300a and 300b, each of which forms one half of a lens holder according to such an embodiment. Similar to the previous embodiment, the two pieces can be joined together, e.g., via a plurality of fasteners, to form the lens holder (alternatively, in another embodiment, the lens holder can be formed of a single integral unit). In this embodiment, each piece 300a/300b includes a proximal portion A and a distal portion B. The proximal portion of each piece 300a/300b includes a multi-faceted depression 302a/302b that can receive a thin preformed metal reflector piece 304a/304b, which is configured to conform to the surface of the depression. In this embodiment, the thin preformed metal reflector pieces include two thin stamped/formed aluminum reflectors. Upon assembling the two pieces 300a and 300b together, a lens holder is formed, which provides a hollow lightpipe in which the thin metal reflector pieces form a reflective optical surface for reflecting at least a portion of the light from a light source coupled into the lightpipe. In some embodiments, the thin metal reflector pieces can have a thickness in a range of about 0.005 inches to about 0.020 inches.

Figure 4:
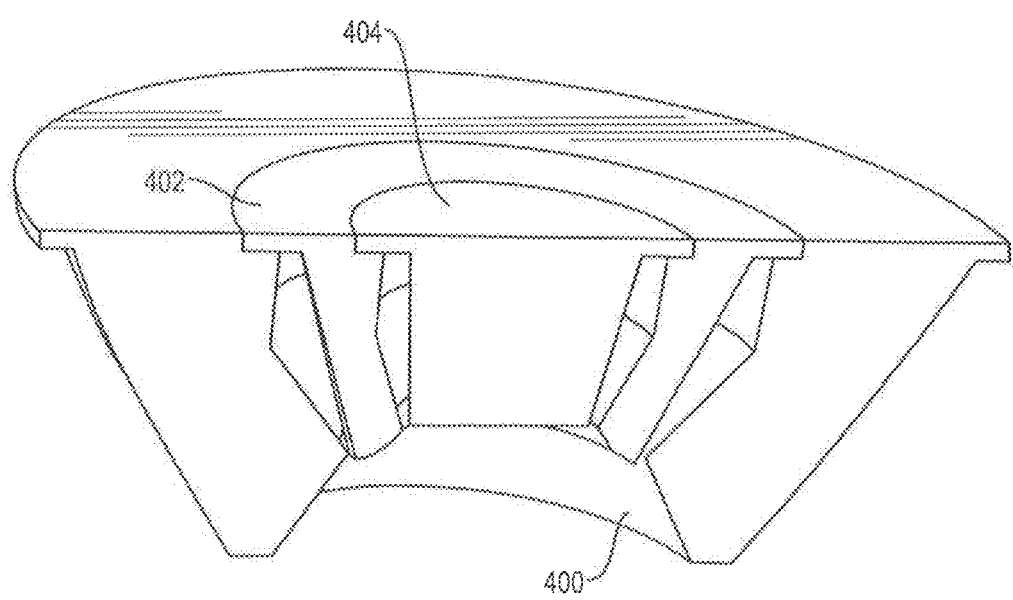
FIG. 4 is a perspective view showing an optic comprising a plurality of nested lenses for use in various embodiments according to aspects of the present disclosure.

In various embodiments, an optic comprising nested lenses may be used in conjunction with the lens holder. FIG. 4 shows one embodiment of such an optic, including nested lenses 400, 402 and 404, each inner lens being disposed within a cavity of an adjacent outer lens. The nested lenses may be disposed within a lens holder. For example, the optical system 100 shown in FIGS. 2A to 2E may include the nested lenses of FIG. 4 instead of the lens 120. The nested lenses may be disposed within the lens holder 140. The nested lenses may also be used in conjunction with other embodiments disclosed herein. Various embodiments of nested lenses are further described in U.S. patent application Ser. No. 13/955,839 filed Jul. 31, 2013 and titled "Low Profile Multi-Lens TIR," which is herein incorporated by reference in its entirety.

Those having ordinary skill in the art will appreciate that various changes can be made to the above embodiments without departing from the scope of the invention.

The invention claimed is:

1. An optical system, comprising
   a solid lightpipe extending from a proximal end to a distal end, said lightpipe being configured for optical coupling at its proximal end to a light source,
   a lens having an input surface, and output surface, and a peripheral surface extending between said input surface and said output surface, said input surface being optically coupled to said distal end of the lightpipe to receive light therefrom,
   wherein said peripheral surface of the lens is configured to reflect via total internal reflection light received from the lightpipe incident thereon.

2. The optical system of claim 1, further comprising a plurality of microlenses disposed on the output surface of said lens.

3. The optical system of claim 1, wherein said solid lightpipe comprises a metal coating disposed on an underlying inner surface thereof.

4. The optical system of claim 3, wherein said solid lightpipe is adapted to cause mixing of at least a portion of light rays from said light source via reflection at said inner surface.

5. The optical system of claim 1, wherein said solid lightpipe is configured to reflect light received from said light source via total internal reflection.

6. An optical system, comprising
   a lens holder comprising a hollow waveguide extending from a proximal end adapted to receive light from a light source to a distal end, and further comprising a distal portion configured to receive at least one lens,
   wherein said hollow waveguide comprises a reflective optical surface for reflecting at least a portion of the light received from the light source so as to direct the reflected light to said distal end of the waveguide; and
   a plurality of nested lenses disposed within the distal portion of said lens holder and optically coupled to said hollow waveguide so as to receive the reflected light from said distal end of the waveguide,
   wherein said waveguide is adapted to cause mixing of at least a portion of the received light rays via reflection at said optical surface thereof.

7. The optical system of claim 6, wherein said reflective optical surface comprises a metal coating disposed on an underlying inner surface of the lens holder.

8. The optical system of claim 6, wherein said lens holder includes a multifaceted depression comprising said reflective optical surface.

9. The optical system of claim 6, wherein said reflective optical surface is a preformed metal reflector.

\* \* \* \* \*